VOLTAGE TO FREQUENCY CONVERTER

Filed Dec. 17, 1962 3 Sheets-Sheet 1

SAMUEL A. SCHWARTZ
INVENTOR

Feb. 9, 1965 S. A. SCHWARTZ 3,169,233

VOLTAGE TO FREQUENCY CONVERTER

Filed Dec. 17, 1962 3 Sheets-Sheet 2

SAMUEL A. SCHWARTZ
INVENTOR

Feb. 9, 1965 S. A. SCHWARTZ 3,169,233

VOLTAGE TO FREQUENCY CONVERTER

Filed Dec. 17, 1962 3 Sheets-Sheet 3

SAMUEL A. SCHWARTZ
INVENTOR

United States Patent Office 3,169,233
Patented Feb. 9, 1965

3,169,233
VOLTAGE TO FREQUENCY CONVERTER

Samuel A. Schwartz, 11490 Crest Ridge Drive, Los Altos, Calif.

Filed Dec. 17, 1962, Ser. No. 245,074
18 Claims. (Cl. 332—12)

This invention relates to a novel voltage to frequency converter.

Voltage to frequency converters are generally useful in systems wherein it is desirable to process frequency modulated (FM) signals in preference to amplitude modulated (AM) signals. For example, these converters are utilized in recording and reproducing systems that record and play back wideband or high frequency signals, such as video or television signals, or in telemetric systems that transmit information over substantial distances.

However, known voltage to frequency converters have utilized integrating networks including precision capacitors to effectuate the conversion of a signal voltage to an FM waveform. Such circuits are subject to drift of the capacitor thereby producing spurious pulses in the output signal. For example, when there is zero input voltage, there may be an objectionable signal read out as a result of such erratic drift. Thus, the frequency signal output is dependent upon the linearity of the converter circuit and the performance of the integrator or precision capacitor.

When processing signals in magnetic recording or telemetry systems or other information handling apparatus, it is necessary to eliminate such spurious signals in order to reproduce the information faithfully. Various solutions have been offered utilizing additional complex circuitry in order to compensate for the undesirable variations in capacitor characteristics and of other parameters of the converter circuit. Such additional circuitry adds substantially to the cost and maintenance of data handling systems.

An object of this invention is to provide a novel and improved voltage to frequency converter.

Another object of this invention is to provide a substantially linear voltage to frequency converter that is not dependent on the characteristics of a precision capacitor.

In accordance with this invention, a voltage to frequency converter comprises an inductive means for transforming an input voltage signal to an inductive current, and means for sensing the magnitude of such current. The inductive current is sampled over discrete time intervals measured by closely spaced clock pulses received from a pulse generator. When the inductive current reaches a predetermined level, the current in the inductive means is reversed but only for a period defined by two consecutive clock pulses. In this manner, a pulse output signal is developed, having a frequency determined by the cyclic rise of inductive current that is representative of the amplitude of the input voltage.

In an embodiment of the invention, the inductive means is connected to a first source of reference potential, such as ground, so that inductive current flows and increases in one direction in the presence of an input voltage. When the inductive current reaches a predetermined level, the inductive means is automatically switched to a second voltage reference source that provides a reference voltage of such amplitude as to cause a reversal of the current flow through the inductive means. The switching between the first and second voltage references occurs only in the presence of a clock pulse being supplied by a pulse generator to a gate that controls the switching action. The following clock pulse resets the gate that enables switching back to the first voltage reference source, and thereby again reverses the inductive current. In this manner, a sawtooth waveform of current is developed having a frequency representative of the input voltage amplitude.

In a particular embodiment of the invention, a magnetic core having a plurality of windings serves as the current sampler and provides a gating action for actuating a switch. In an alternative embodiment of this invention, the means for sensing the magnitude of the inductive current to determine whether the predetermined switching level has been reached comprises a pair of differentially connected transistors that provide a similar gating action for driving the switch that couples the inductive means alternately between the two voltage references.

The invention will be described in greater detail with reference to the drawing in which:

FIGURE 1 is a block diagram of the inventive circuit;

FIGURES 2A–G are waveforms representative of the signals being processed through the circuit illustrated in FIGURE 1;

Similar reference numerals refer to similar parts throughout the drawing.

Figure 1:
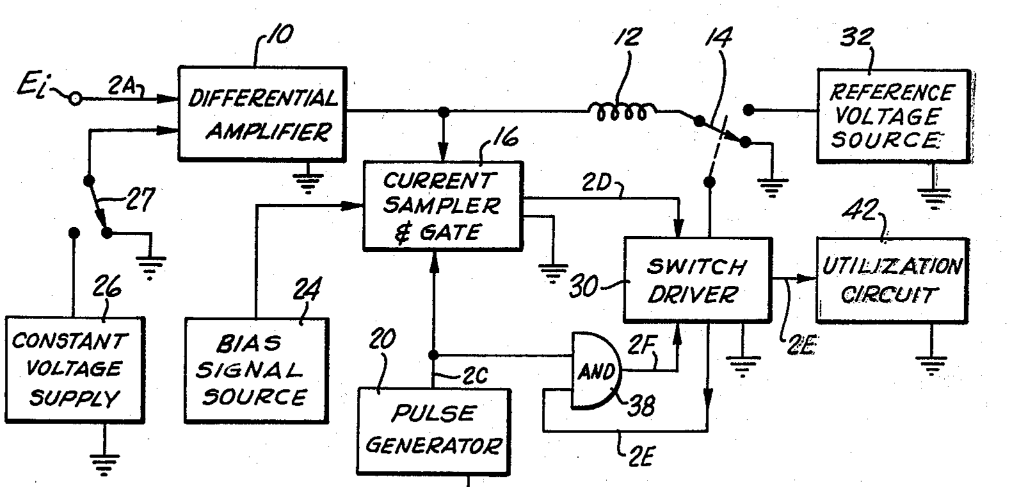
Figure 2:
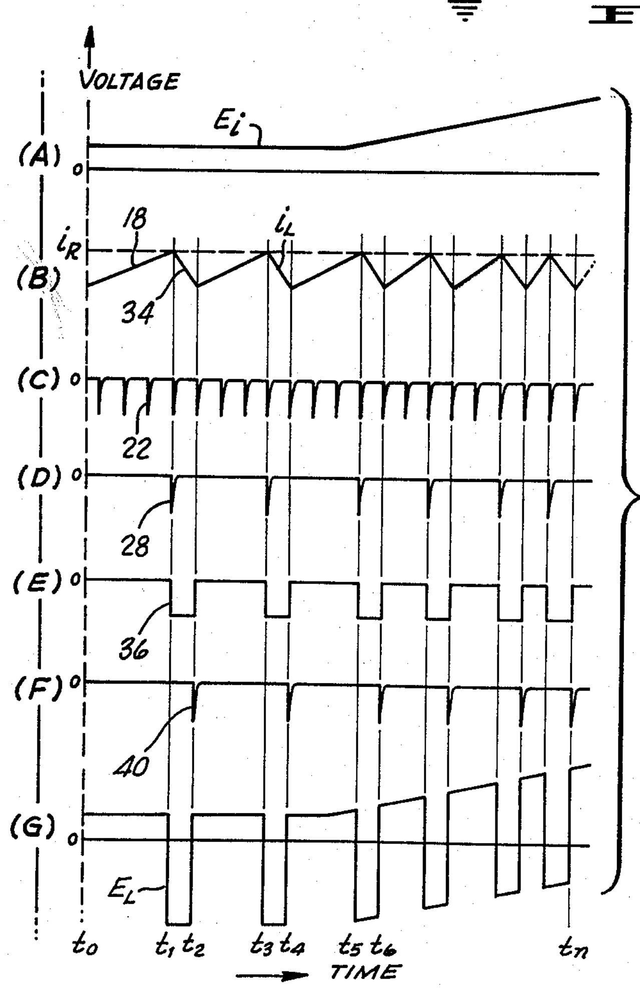

In FIGURE 1, a voltage to frequency converter comprises means for applying an input voltage signal $E_i$ (FIGURE 2A) to a difference amplifier 10. The input signal $E_i$ is amplified and fed from the amplifier 10 to an inductance 12 that is coupled through a switch 14, in a first position, to a fixed reference potential, such as ground as indicated in FIGURE 1. An inductive current $i_L$ resulting from the difference between the amplified input signal $E_i$ and ground $E_0$ is seen by a current sampler and gate 16 that is coupled between the output circuit of the amplifier 10 and the inductance 12. The amplifier 10 presents a high input impedance to the input voltage source and a low input impedance to the inductance 12. The amplifier 10 is preferably a solid state potentiometric amplifier having chopper stabilization for low D.C. drift and offset.

As the input voltage $E_i$ is applied, the current $i_L$ in the inductance 12 builds up linearly, as shown by the positive going slope 18 in FIGURE 2B for the interval $t_0$–$t_1$. The relation of the resulting current $i_L$ in the inductance 12 may be represented as shown below:

$$E_L = L\frac{di}{dt} \quad (1)$$

$$di = \frac{E_L}{L}dt \quad (2)$$

$$\int di = \frac{1}{L}\int_0^{t_1} E_L dt \quad (3)$$

$$i = \frac{1}{L}\int_0^{t_1} E_L dt \quad (4)$$

Since $$E_L = AE_i \quad (5)$$

where $A$=the amplification factor or amplifier gain, then $$i = \frac{1}{L}\int_0^{t_1} AE_i dt \quad (6)$$

and $$i=\frac{A}{L}\int_0^{t_1} E_i dt \qquad (7)$$

In a given time interval ($t_0$–$t_1$), the current in the inductance will increase according to the above expression (7). For a constant input voltage $E_1$, the inductive current $I_L$ will rise linearly as follows:

$$iL=\frac{A}{L}\int_0^{t_1} E_i dt \qquad (8)$$

$$iL=\frac{AE_i t}{L}\Big]_0^{t_1} \qquad (9)$$

At time $t_1$, the current in the inductance 12 will be $$i_L=\frac{AE_i t_1}{L} \qquad (10)$$

The waveforms for the inductive current $i_L$ and the voltage $E_L$ across the inductance 12 are represented by FIGURES 2B and 2G respectively.

Simultaneously, a pulse generator 20 provides closely spaced negative clock pulses 22 (FIGURE 2C) to the current sampler and gate 16. In addition, a bias signal source 24 supplies a bias current to the current sampler and gate 16 for determining the operating characteristics of the converter and for establishing a predetermined level $I_R$ at which the switching action of the inventive system occurs. The bias signal may be a direct current (D.C.), such as utilized in direct recording systems, or an alternating current (A.C.) generally used in frequency modulation (FM) recording apparatus. In the event that FM recording is employed, a constant voltage supply 26 is coupled to the input circuit of the amplifier 10 by means of a switch 27 and serves to provide a carrier signal or center frequency that is modulated by the input signal $E_1$.

When the current sampler 16 senses that the inductive current ($i_L$) is at a predetermined reference level $i_R$, the gate associated with the sampler 16 is opened to pass a negative clock pulse 28 (FIGURE 2D), that is coincident with a clock pulse 22 at time $t_1$, $t_3$, $t_5$ . . ., to a switch driver 30. The pulse 28 activiates the driver 30 so that the switch 14 is connected to a second voltage source 32 that supplies a reference voltage $E_R$ to the inductance 12. The reference voltage $E_R$ is of such value that a reversal of inductive current and discharge of the inductance 12 occurs, as illustrated by the negative going slope 34 of the sawtooth current waveform of FIGURE 2B. However, the next clock pulse 22 at $t_2$, $t_4$, $t_6$ . . . from the pulse generator 20 flows through an AND gate 38 to the switch driver 30, and causes the switch 14 to return the inductance 12 to ground. Thus, the voltage $E_L$ is reversed across inductance 12 thus causing the current $i_L$ to be reversed for a period defined by the time between successive clock pulses 22.

In response to the pulses from the sampler and gate 16, the switch driver 30 produces a pulse signal 36 (FIGURE 2E) that is directed to the AND gate 38. In the presence of a clock pulse 22, the AND gate feeds a pulse 40 (FIGURE 2F) to the switch driver 30 causing the driver 30 to pass the pulse output signal 36 to a utilization circuit 42, which may be a magnetic playback system for example.

With reference to FIGURE 2G, it is noted that the product of volts and seconds for any half cycle $t_0$–$t_1$, $t_2$–$t_3$, $t_4$–$t_5$, . . ., as represented by the positive portions of the waveform areas, is equal to the volts-seconds products of the following half cycle $t_1$–$t_2$, $t_3$–$t_4$, $t_5$–$t_6$, . . ., represented by the negative area portions. The positive and negative waveform portions correspond respectively to the charge and discharge periods of the inductance 12, wherein the charging period is determined by the input signal voltage $E_1$ received from an external source, and the discharge period is determined by the repetition rate of the clock pulse 22 generated internally.

Frequency of operation may be determined by defining the time required for charging and discharging the inductance 12 as follows:

*Charge time*

$$E=\frac{Ldi_1}{dt} \qquad (11)$$

$$\int_0^{t_1} Edt=\int_0^{t_1} Ldi_1 \qquad (12)$$

$$E=E_1$$

$$\int_0^{t_1} E_1 dt=\int_0^{t_1} Ldi_1 \qquad (13)$$

$$(t_1-0)=\frac{Li_1}{Ei} \qquad (14)$$

*Discharge time*

$$E_L=-(E_R-E_1)=E_1-E_R \qquad (15)$$

$$E_1-E_R=L\frac{di_2}{dt} \qquad (16)$$

$$\int_{t_1}^{t_2}(E_1-E_R)dt=\int_{t1}^{0} Ldi_2 \qquad (17)$$

$$(E_1-E_R)t\Big]_{t_1}^{t_2}=Li_2\Big]_{i_1}^{0} \qquad (18)$$

$$(E_1-E_R)(t_2-t_1)=-Li_1 \qquad (19)$$

$$(t_2-t_1)=\frac{Li_1}{E_R-E_1} \qquad (20)$$

$$f=\frac{1}{(t_1-0)+(t_2-t_1)} \qquad (21)$$

$$f=\frac{1}{\frac{Li_1}{E_1}+\frac{Li_1}{E_R-E_1}} \qquad (22)$$

$$f=\frac{E_1(E_R-E_1)}{Li_1E_R} \qquad (23)$$

In a practical converter, a relation may be established between $E_R$ and $E_1$ at the highest operating frequency, so that:

$$E_R=KE_1$$

K being a constant.

Substituting the above relation in the formula for frequency:

$$f=\frac{E_1(K-1)}{LI_1K} \qquad (24)$$

Having established K at the highest operating frequency, it may be seen that frequency is directly proportion to $E_1$. Thus for any frequency $f_n$:

$$f_n=\frac{E_n(E_n-1)}{LI_1K_n} \qquad (25)$$

The amplifier 10 used to drive the inductance 12 changes $E_1$ to $AE_1$ so that:

$$f_n=AE_{1_n}\left(\frac{i}{LI_1}\right)\left(\frac{K-l}{K}\right) \qquad (26)$$

The $Li_1$ product in the denominator above is self compensating so that changes in inductance L produce compensating changes in $i_1$. Frequency is thus independent of changes in inductance.

Figure 3:
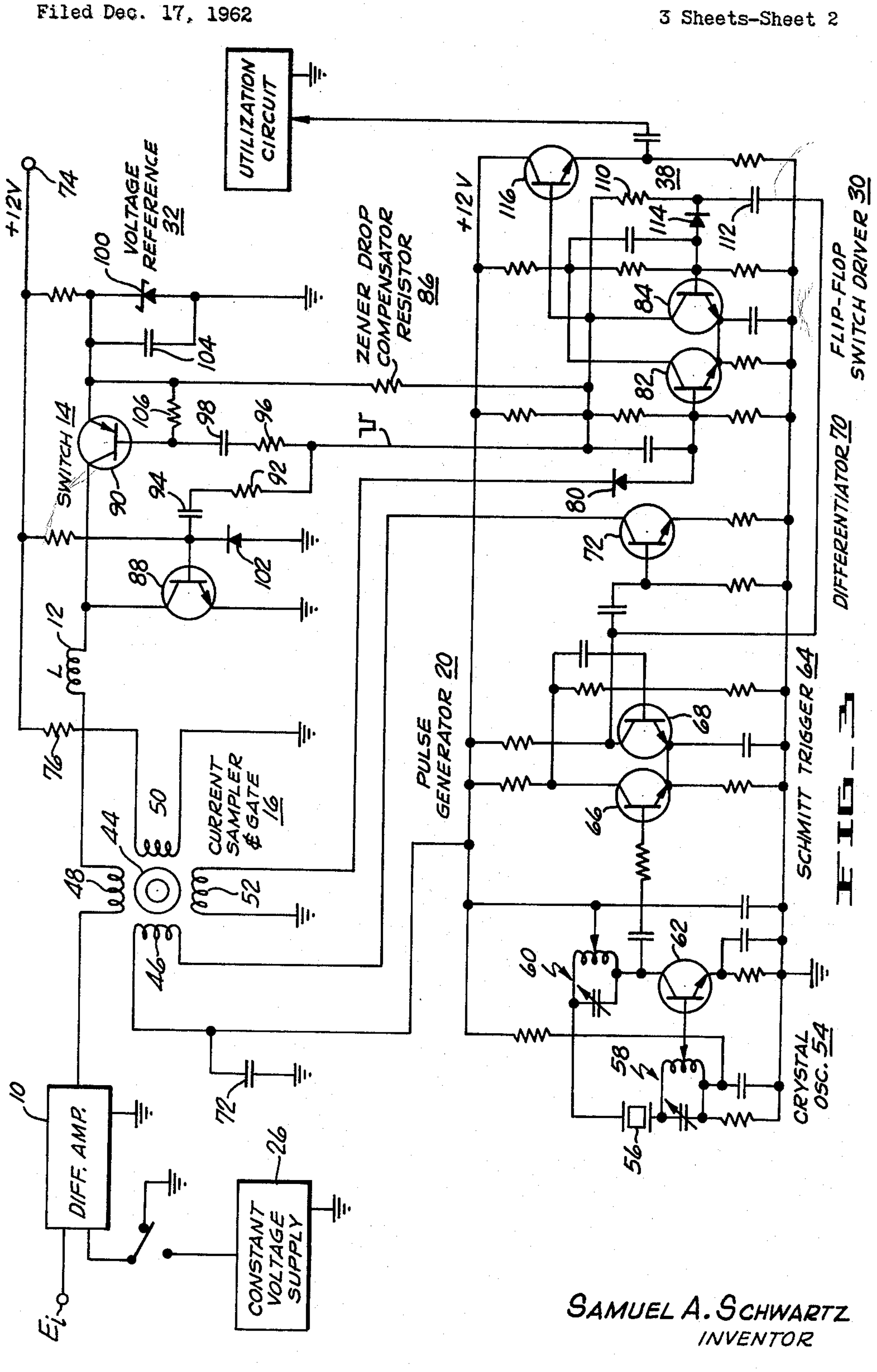
FIGURE 3 is a schematic diagram, partly in block, of an embodiment of the inventive circuit shown in FIGURE 1.

FIGURE 3 represents a particular embodiment of the system set forth in FIGURE 1 wherein the current sampler and gate 16 comprises a magnetic core 44 and associated windings 46, 48, 50 and 52. A series of pulses are derived from a crystal oscillator 54 having a reference standard or crystal 56, and variable LC circuits 58 and 60 coupled to the base and collector of a transistor oscillator 62. The frequency or repetition rate of the developed pulses are controlled by a Schmitt trigger 64, which includes a pair of emitter coupled transistors 66 and 68, and a differentiating circuit 70 having a transistor 72. The trigger circuit 64 and differentiator 70 operate in a well known manner to provide clock pulses 22 to the input pulse core winding 46, obtained from the collector or output circuit of transistor 72.

A bias signal is obtained from a voltage source 74 through a bias resistor 76 that is coupled to one end of the bias winding 50, the other end of the winding being connected to ground. The bias signal supplied to the winding 50 drives the core 44 into saturation so that the core is operating beyond the remanent flux level and near the knee 78 of the magnetization curve of FIGURE 4. Inductive current $i_L$ is sampled by the sampling winding 48 and results in operation of the core 44 past the knee 78. When the core 44 begins to operate along the slope of the curve as evidenced by a marked increase in core permeability, the next clock pulse 22 received by the input pulse winding 46 is passed through the output winding 52. The negative pulse 28 forward biases a diode 80 into conduction and sets a flip-flop circuit that serves as the switch driver 30. A first transistor 82 of the flip-flop becomes nonconducting, whereas a second transistor 84 is driven into conduction. The output signal from the collector circuit of the second transistor 84 is passed through a resistor 86 to the switch 14, comprising complementary transistors 88 and 90. The output pulse signal is channeled through a resistor 92 and a coupling capacitor 94 to the base of transistor 88, and through a resistor 96 and coupling capacitor 98 to the base of transistor 90 initiating the switching action. The switch transistor 90 becomes conducting and thereby effectively couples the inductance 12 with the Zener diode reference circuit 32. This action causes a reversal of the inductive current as described with reference to FIGURES 1 and 2. In conjunction with transistor 90, the resistor 86 provides compensation for any drop across the impedance of the Zener diode 100.

A diode 102 is coupled between the base of the transistor 88 and the coupling capacitor 94 to limit the turn-off voltage on the transistor 88 for improved switching action. Also, a bypass capacitor 104 is shunted across the Zener diode 100 to maintain a steady voltage on the voltage reference 32. In addition, a base to emitter return resistance 106 is provided for transistor 90 for collector leakage current.

The next clock pulse 28 received from the output pulse winding 52 resets the flip-flop, driving transistor 82 into conduction whereas transistor 84 is turned off. The output pulse signal from transistor 82 turns off transistor 90 and causes transistor 88 to conduct, thereby providing a relatively low impedance path between the inductance 12 and ground potential, resulting in the desired switching action.

The switching action produces the pulse waveform (FIGURE 2E) that is indicative of the input information signal or voltage. The repetition rate of the pulses or the frequency is manifested in the output signal that is obtained from the flip-flop driver circuit. Such output signal, which appears as the pulse output waveform 36 representing a frequency signal proportioned to the voltage input, is coupled from the output circuit of switch driver 30 to the utilization circuit 42 through an emitter follower 116 for further processing.

Figures 4, 5:
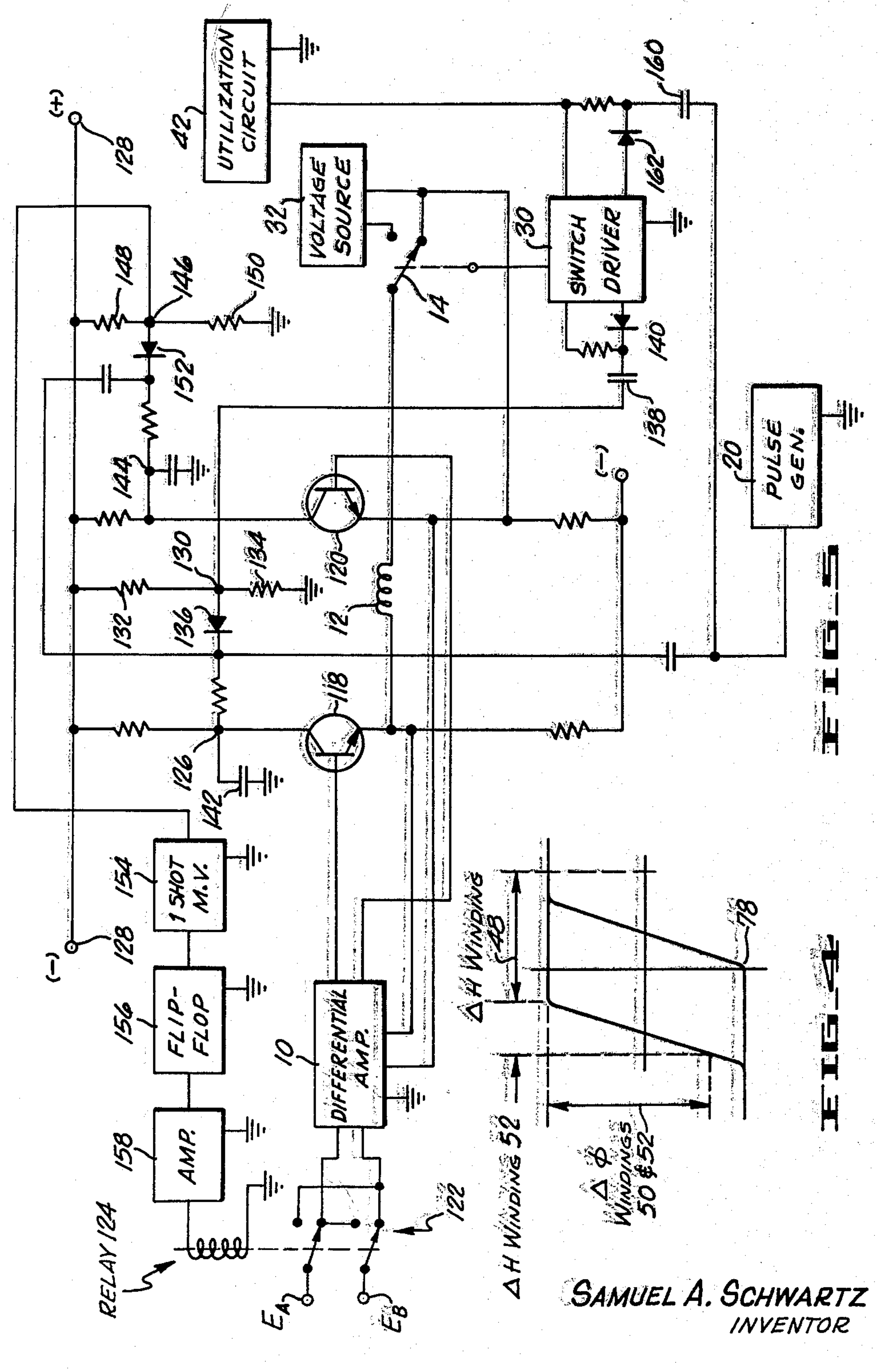
FIGURE 4 is a representation of the well known hysteresis loop, also known as the magnetization or B–H curve, that is useful in the explanation of the embodiment shown in FIGURE 3.
FIGURE 5 is a schematic diagram, partly in block, of an alternative embodiment of the invention.

In FIGURE 5, an alternative embodiment of the inventive circuit is illustrated wherein the current sampler and gate comprises a pair of differentially connected transistors 118 and 120. The inductance 12 is coupled between the emitter of transistor 118 and the switch 14 that returns to the emitter of transistor 120, when the switch is in a first position during the period $t_0$–$t_1$, $t_2$–$t_3$, . . . The switch 14 may be actuated into a second position by the switch driver 30 for connection to the reference voltage source 32 for the intervals $t_1$–$t_2$, $t_3$–$t_4$, . . ., as explained heretofore.

In operation, assume that differential input signals $E_A$ and $E_B$, such as may be derived from a transducer that produces a voltage output proportional to a measured parameter, are applied to the difference amplifier 10 through a relay switch 122 that may be operated by a relay actuator 124, as explained hereinafter. The amplifier 10 feeds a floating signal output to the bases of transistors 118 and 120 respectively. If we assume that the amplified input signal $E_A$ is positive, the signal applied to the base of transistor 118 causes this transistor to conduct thereby resulting in a current flow from the emitter of transistor 118 through the inductance 12 and switch 14 and to the emitter of the transistor 120. The inductance 12, which is coupled between the emitters of the transistor 118 and transistor 120 through the switch 14, sees a differential voltage that is the difference between the amplified input signals $E_A$ and $E_B$. A resulting inductive current $i_L$ is developed in proportion to the differential voltage.

As the inductive current $i_L$ increases, as depicted in FIGURE 2B, the collector voltage of transistor 118 drops. When the voltage at a junction point 126 tied to the collector of transistor 118 becomes less than the bias voltage provided by a voltage source 128 to a junction point 130 located between two resistors 132 and 134 that form a voltage divider, then a diode 136 coupled between such collector circuit and the driver 30 is forward biased and conducts. The conducting diode 136 passes negative pulses from the pulse generator 20 to the switch driver 30 through a D.C. blocking capacitor 138 and a steering diode 140. With the continuous application of the differential input signals $E_A$ and $E_B$, the pulses become more negative whereby a sufficiently negative pulse sets the flip-flop driver 30, thereby causing the switch 14 to be coupled to the voltage source 32. A bypass capacitor 142 prevents feedback of the negative pulse to the transistor circuit 118.

With the inductance 12 coupled to the voltage source 32, the inductive current is reversed initiating the discharge period defined by the negative going portion 34 of the sawtooth waveform represented in FIGURE 2B. The succeeding negative clock pulse from the generator 20 passes through a coupling capacitor 160 and diode 162 and resets the flip-flop driver circuit 30 resulting in a coupling of the switch 14 to the emitter circuits of the emitter follower transistors 118 and 120. The inductance 12 begins to charge to initiate a new cycle for developing a pulse output waveform having a frequency correlated to the voltage input signals received by the difference amplifier 10.

In order to compensate for undesirable drifts in the differential voltage at the emitters of the transistors 118 and 120, feedback paths may be coupled between the emitters and the differential amplifier 10.

In such case where the input signal $E_A$ is less positive than $E_B$, the base of transistor 120 would see a more positive signal than the base of transistor 118. Thus the potential at the junction 126 increases whereas a junction 144 in the collector circuit of transistor 120 experiences a decreasing voltage. When the voltage at junction 144 is more negative than the voltage at a junction 146 between resistors 148 and 150 of a voltage divider coupled to the bias voltage source 128, a diode 152 coupled between the junctions 144 and 146 becomes conducting. As a result, clock pulses 22 from the generator 20 pass through the diode 152 to trigger a one shot multivibrator 154. The leading edge of the negative output pulse from the multivibrator 154 sets a flip-flop 156 that feeds a pulse of a predetermined duration through an amplifier 158 to energize the relay actuator 124. The relay actuator activates the double pole, single throw switch 122 so as to reverse the input leads connected to the difference amplifier 10.

The one shot multivibrator 154 produces a pulse having a duration greater than the pull-in time of the relay 124. At the end of such pulse, the circuit functions to generate the output pulse waveform 36 (FIGURE 2E). If the input signals $E_A$ and $E_B$ were to reverse their polarities relative to each other during operation, then the circuit activates the relay 124 again for switching the switch 122 to provide signals of suitable relative polarity to the bases of the transistors 118 and 120.

There has been described herein a voltage to frequency converter wherein an input voltage is transformed to an inductive current which is sampled over discrete time intervals measured by clock pulses. When a predetermined current level is sensed, the inductive current is reversed for a period equivalent to a time interval between two clock pulses. The charging cycle of the inductance is determined by the amplitude of the input signal, whereas the discharge cycle is controlled by the internally generated clock pulses. The operational accuracy of the circuit is not affected by changes in the characteristics of the inductance. However, the inductance should have a high Q and low distributed capacitance.

In a system wherein a multiplicity of voltage to frequency converters are needed, a single crystal oscillator can serve as the pulse generator to provide clock pulses for all the units thus affording economy in parts and maintenance. Also, full scale readings may be achieved by the ease of interchangeability of crystals of different frequencies. In the same vein, a plurality of crystals may be employed with a suitable switch in a single converter.

It is understood that the scope of the invention is not limited to the particular embodiments described above, but includes such converters that employ an inductive circuit wherein the volts times seconds waveform area of an input voltage signal is substantially the same as that for an internally generated signal.

What is claimed is:

1. A voltage to frequency converter comprising:
means for deriving an input voltage signal;
means for transforming such signal to an inductive current flowing in one direction;
means for measuring the inductive current over discrete time intervals;
means for reversing the current flow when the inductive current is measured at a predetermined level;
pulse means for controlling the current flow reversing means;
such inductive current flows determining a pulse output signal having a frequency dependent on the input voltage signal.

2. A voltage to frequency converter comprising:
means for deriving an input voltage signal;
means for transforming such signal to an inductive current flowing in one direction;
means for measuring the inductive current over discrete time intervals;
means for reversing the current flow when the inductive current is measured at a predetermined level;
means for controlling the duration of the current flow reversal, said controlling means comprising clock pulse means, a flip-flop switch driver responsive to said clock pulse means, and a switch responsive to said switch driver;
such inductive current flows determining a pulse output signal having a frequnecy dependent on the input voltage signal.

3. A voltage to frequency converter comprising:
means for producing a charging inductive current in response to a voltage input signal;
means for measuring the inductive current;
means for producing a discharging inductive current for a predetermined interval determined by a fixed volt-second area when the measured current reaches a predetermined level less than the saturation level of said measuring means; and
means for generating a pulse waveform correlated with said charging and discharging cycles.

4. A voltage to frequency converter comprising:
means for producing a charging inductive current in response to a voltage input signal;
magnetic core means for measuring the inductive current;
switching means for producing a discharging inductive current for a predetermined interval determined by a fixed volt-second area when the measured current reaches a predetermined level less than the saturation level of said measuring means; and
means for generating a pulse waveform correlated with said charging and discharging cycles.

5. A voltage to frequency converter comprising:
means for producing a charging inductive current in response to a voltage input signal;
means for measuring the inductive current;
means for producing a discharging inductive current for a predetermined interval when the measured current reaches a predetermined level;
means for providing clock pulses to determine the limits of the charging and discharging cycles; and
means for generating a pulse waveform correlated with said charging and discharging cycles.

6. A voltage to frequency converter comprising:
an inductance for producing a charging inductive current in response to a voltage input signal;
transistor means for measuring the inductive current;
switching means for producing a discharging inductive current for a predetermined interval when the measured current reaches a predetermined level;
pulse generator means for providing clock pulses to determine the limits of the charging and discharging cycles; and
flip-flop circuit means for generating a pulse waveform correlated with said charging and discharging cycles.

7. A voltage to frequency converter comprising:
means for applying an input voltage signal;
means for developing a current having a magnitude related to the amplitude of the input voltage signal;
a voltage reference source adapted to be coupled to said current developing means;
a current sensing means for measuring the level of current in said current developing means;
a pulse generator for providing clock pulses;
an AND gate coupled to said current sensing means and to said pulse generator;
a switch for coupling said current developing means alternately to said voltage reference source and to a point of reference potential; and
a switch driver for energizing said switch between the source and the point of reference potential responsive to said AND gate.

8. A voltage to frequency converter comprising:
means for applying an input voltage signal;
means for developing a current having a magnitude related to the amplitude of the input voltage signal;
a voltage reference source adapted to be coupled to said current developing means;
a current sensing means for measuring the level of current in said current developing means, said sensing means including a magnetic core;
a pulse generator for providing a clock pulses;
an AND gate coupled to said current sensing means and to said pulse generator;
a switch for coupling said current developing means alternately to said voltage reference source and to a point of reference potential; and
a switch driver including a flip-flop circuit for energizing said switch between the source and the point of reference potential responsive to said AND gate.

9. A voltage to frequency converter comprising:
an input circuit for providing an input voltage signal;
a differential amplifier for amplifying the input signal;

an inductance coupled to the output of said amplifier for developing an inductive current in response to the input voltage signal;
a first source of potential adapted to be coupled to said inductance;
a second source of potential adapted to be coupled to said inductance;
a switch coupled to said inductance for connecting said inductance alternatively to said first source or said second source;
a switch driver for actuating said switch between said first and second sources; said driver having a flip-flop transistor circuit;
a current sampler for sensing the magnitude of the inductive current coupled to said inductance;
an AND gate coupled to said pulse generator for passing clock pulses to said switch driver for controlling the action of the flip-flop circuit;
a pulse generator for providing clock pulses to said current sampler, such pulses being gated through said sampler when the magnitude of the sensed inductive current reaches a predetermined level.

10. A voltage to frequency converter for obtaining a pulse output signal from an input voltage signal comprising:
inductive means for developing an inductive current in response to the input voltage signal;
a first reference voltage source adapted to be coupled to said inductive means;
a second reference voltage source adapted to be coupled to said inductive means;
a switch for coupling said inductive means alternatively to one of said voltage sources;
a current sensing means for measuring the current in said inductive means;
a switch driver for energizing said switch for connection to one of voltage sources;
an AND gate coupled between said current sensing means and said switch driver; and
a pulse generator for providing clock pulses to said current sensing means and to said AND gate.

11. A voltage to frequency converter for obtaining a pulse output signal from an input voltage signal comprising:
inductive means for developing a charging inductive current in response to the input voltage signal;
a switch for coupling said inductive means to ground potential during charging of the inductive means;
a current sensing means for measuring the level of current in said inductive means;
a switch driver for actuating said switch when said current sensing means detects a predetermined level of inductive current;
a reference voltage source adapted to be coupled to said inductive means when said switch is actuated for providing a discharge of inductive current;
a pulse generator for providing clock pulses to define the periods of inductive charging and discharging;
an AND gate coupled to said current sensing means and said pulse generator for controlling the switch driver; and
a utilization circuit coupled to said switch driver for deriving a pulsed output signal having a frequency representative of the amplitude of the input voltage signal.

12. A voltage to frequency converter comprising:
means for deriving an input voltage signal;
a differential amplifier for amplifying the input signal;
an inductive winding having one end coupled to the output circuit of said amplifier for providing an inductive current in response to the amplified input signal;
a first source of reference voltage;
a second source of reference voltage;
a switch coupled to the other end of said inductive winding for selectively coupling said winding to said first source or said second source;
a flip-flop switch driver for actuating said switch between said voltage sources;
a current sampler and gate for sampling the inductive current;
a signal source for providing a bias signal to said current sampler;
a pulse generator for providing clock pulses to such current sampler and gate;
an AND gate coupled between the output circuit of said pulse generator and the input circuit of said switch driver; and
a constant voltage supply adapted to be coupled to the input circuit of said differential amplifier for providing a carrier signal.

13. A voltage to frequency converter comprising:
means for deriving an input voltage signal;
a differential amplifier for amplifying the input signal;
an inductive winding having one end coupled to the output circuit of said amplifier for providing an inductive current in response to the amplified input signal;
a first source of reference voltage;
a second source of reference voltage;
a switch coupled to the other end of said inductive winding for selectively coupling said winding to said first source or said second source;
a flip-flop switch driver for actuating said switch between said voltage sources;
a current sampler and gate comprising a magnetic core and a plurality of windings, for sampling the inductive current;
a signal source for providing a bias signal to one of the core windings of said current sampler;
a pulse generator for providing clock pulses to another one of the core windings;
an AND gate coupled between the output circuit of said pulse generator and the input circuit of said switch driver; and
a constant voltage supply adapted to be coupled to the input circuit of said differential amplifier for providing a carrier signal.

14. A voltage to frequency converter comprising:
means for deriving a differential voltage signal;
a differential amplifier for amplifying such voltage signal;
a first transistor having its base coupled to said amplifier;
a second transistor having its base coupled to said amplifier;
an inductive means having one end coupled to the emitter circuit of said first transistor;
a switch coupled to the other end of said inductive means;
means for applying a bias signal to the collector circuit of said first transistor;
a source of reference voltage;
switch driver means for selectively actuating said switch between the emitter circuit of said second transistor and said voltage source;
a diode coupled between the collector circuit of said first transistor and said switch driver; and
pulse generator means for applying clock pulses to a point between the collector circuit of said first transistor and said diode, said diode passing such clock pulses to said switch driver when the combined bias signal and collector output signal forward bias such diode, whereby a pulse waveform having a frequency dependent on the derived voltage signal is developed.

15. A voltage to frequency converter comprising:
means for deriving a differential voltage signal;
a differential amplifier for amplifying such voltage signal;
a first transistor including base, emitter and collector electrodes, having its base coupled to said amplifier;
a second transistor including base, emitter and collector electrodes having its base coupled to said amplifier;
means for coupling the emitters of said transistors to the differential amplifier to form feedback paths;
an inductive means having one end coupled to the emitter circuit of said first transistor;
a switch coupled to the other end of said inductive means;
means for applying a bias signal to the collector circuit of said first transistor;
a source of reference voltage;
switch driver means for selectively actuating said switch between the emitter circuit of said second transistor and said voltage source;
a diode coupled between the collector circuit of said first transistor and said switch driver; and
pulse generator means for applying clock pulses to a point between the collector circuit of said first transistor and said diode, said diode passing such clock pulses to said switch driver when the combined bias signal and collector output signal forward bias such diode.

16. A voltage to frequency converter comprising:
means for deriving a pair of voltage signals;
a difference amplifier for amplifying such voltage signals;
a first transistor having its base coupled to said amplifier for receiving one of said signals;
a second transistor having its base coupled to said amplifier for receiving the other of said signals;
an inductive means having one end coupled to the emitter circuit of said first transistor;
a switch coupled to the other end of said inductive means;
means for applying a bias signal to the collector circuit of said first transistor;
a source of reference voltage;
switch driver means for selectively actuating said switch between the emitter circuit of said second transistor and said voltage source;
a diode coupled between the collector circuit of said first transistor and said switch driver;
pulse generator means for applying clock pulses to a point between the collector circuit of said first transistor and said diode, said diode passing such clock pulses to said switch driver when the combined bias signal and collector output signal forward bias such diode;
a relay circuit coupled to the collector circuit of said second transistor, said relay circuit including a one shot multivibrator;

switching means adapted to be activated by such relay circuit for switching said voltage signals to said transistor bases.

17. A voltage to frequency converter comprising:
an inductive means;
means for coupling a voltage input signal to said inductive means, for producing an inductive current denoting a charging period;
means for providing clock pulses;
means for developing a first waveform portion during the charging period of said inductance, measured over discrete time intervals defined by said clock pulses;
means for reversing the inductive current denoting a discharge period;
means for developing a second waveform portion during the discharge period of said inductance, measured by the interval between two clock pulses;
said waveform portions forming a complete cycle, a plurality of such cycles providing a frequency modulated signal related to the voltage input signal.

18. A voltage to frequency converter comprising:
a first transistor having a base, collector and emitter;
a second transistor having a base, collector and emitter;
a source of reference voltage;
a switching means adapted to be switched between said source and the emitter of said second transistor;
an inductance coupled to the emitter of said first transistor and said switching means;
a flip-flop switch driver for actuating said switch between said voltage source and the emitter of said second transistor;
means for applying input voltage signals to the bases of said transistors;
a bias voltage source coupled to the collectors of said transistors;
a pulse generator for providing clock pulses for controlling the operation of said switch driver;
a first diode, coupled to said generator and said driver, and to the collector of said first transistor, for passing the clock pulses to set said flip-flop driver when the collector current reaches a predetermined value;
a second diode coupled to said generator and said driver for passing a clock pulse to reset the flip-flop driver;
whereby a frequency modulated waveform is generated representative of the input voltage signals.

References Cited by the Examiner

UNITED STATES PATENTS

| | | | |
|---|---|---|---|
| 2,897,380 | 7/59 | Neitzert | 331—112 |
| 3,075,084 | 1/63 | Mirahda et al. | 307—88.5 |

ROY LAKE, *Primary Examiner.*